Fig. 1

Nov. 27, 1945. J. W. LIVINGSTON 2,389,793
PRODUCTION OF STYRENE
Filed July 2, 1942 3 Sheets-Sheet 2

JOHN W. LIVINGSTON,
INVENTOR.

ATTORNEY.

Patented Nov. 27, 1945

2,389,793

UNITED STATES PATENT OFFICE 2,389,793

PRODUCTION OF STYRENE

John W. Livingston, St. Louis, Mo., assignor to Monsanto Chemical Company, St. Louis, Mo., a corporation of Delaware Application July 2, 1942, Serial No. 449,522

6 Claims. (Cl. 260—669)

The present invention relates to the production of styrene by the catalytic and non-catalytic pyrolyses of ethylbenzene, ethylbenzene-containing and ethylbenzene-engendering hydrocarbon mixtures and relates particularly to the purification and recovery of styrene in a state of great purity from the products of such pyrolyses. The invention provides a method of recovering styrene from such pyrolysis products by a process of fractional distillation and static crystallization.

The principal object of the present invention is to provide a process of recovering styrene in a state of great purity from the products of catalytic and non-catalytic pyrolyses of ethylbenzene, isopropylbenzene and similar aliphatic hydrocarbon-substituted benzenes and from other hydrocarbon pyrolyses that yield styrene. It is a further object of the present invention to provide a process whereby styrene is recovered from the products of such pyrolyses (catalytic or non-catalytic) without being subjected to prolonged exposure to temperatures which induce rapid polymerization of styrene, that is, a process in which the exposure to such temperatures is maintained at a minimum. It is also an object of the present invention to provide a process whereby a maximum recovery of styrene of high purity from the products of such pyrolyses is possible. Other objects and advantages of the invention, some of which are referred to specifically hereinafter, will be obvious to those skilled in the art.

When ethylbenzene, isopropylbenzene, or a mixture of hydrocarbons which engenders such alkyl-substituted benzene hydrocarbons, such as benzene and ethylene or benzene and acetylene, is pyrolyzed, the products comprise gases, benzene, toluene, ethylbenzene, styrene and other hydrocarbons having boiling points higher than that of styrene, and tars. The precise nature of the hydrocarbons having boiling points close to that of styrene is not known, but they consist, for the greater part, of alkyl-substituted, alkenyl-substituted and alkynyl-substituted benzene hydrocarbons. The proportion of styrene in the products of pyrolysis will vary widely with the conditions of the pyrolysis, but will, in general, be less than about 50% and generally more than about 20% by weight of the products. Ethylbenzene will generally constitute a preponderant proportion of the pyrolysis products. A typical analysis of the liquid products of pyrolysis of ethylbenzene for the production of styrene is represented by the following:

| | Percent by weight |
|---|---|
| Benzene | 6 |
| Toluene | 5 |
| Ethylbenzene | 63 |
| Styrene | 21 |
| Isopropylbenzene | < 1 |
| High boilers | < 1 |
| Tars | 3 |

The separation of styrene from the other components of the mixture of pyrolysis products is conventionally accomplished by fractional distillation. In such distillations, however, polymerization of the styrene is induced. Some degree of control of the polymerization of styrene can be obtained by the use of polymerization inhibitors, e. g., phenols such as tertiary-butylcatechols, nitrobenzenes, sulfur, and the like, during the distillation but it is not possible as a practical matter to suppress it entirely. Styrene is reported to have a boiling point of 146° C. while that of ethylbenzene is reported as 136.2° C. at atmospheric pressure. To obtain a styrene of 99% or higher purity from mixtures of pyrolysis products, by distillation, requires the use of a number of fractionating columns having a relatively great number of plates and a considerable amount of reflux. In such columns a considerable amount of styrene is being maintained for relatively long periods at temperatures which induce polymerization. Furthermore, it is generally desirable to remove substantially all the styrene from the ethylbenzene, prior to return of the latter to the pyrolysis for further conversion to styrene, since the yield of styrene that results from pyrolysis of ethylbenzene containing styrene is not substantially greater than that obtained on pyrolyzing pure ethylbenzene.

According to the present invention, the products of such pyrolyses are subjected to a topping distillation to separate benzene and toluene from styrene and higher-boiling products. This distillation is conducted with as short a sojourn of the styrene in the column as possible and no attempt is made to separate any substantial part of the individual components of the overhead. The styrene is not exposed to prolonged heating since benzene, toluene and a small proportion of the ethylbenzene which appear in the overhead fraction are separated from each other in other columns. The topped fraction (residue) is then subjected to a flash distillation to make a rough separation of tars from ethylbenzene and styrene which comprise the greater portion of the overhead products. The overhead also contains hydrocarbons having boiling points close to that of styrene and also high boilers, that is, hydrocarbons having boiling points substantially higher than that of styrene. The removal of a large portion of tars reduces the temperatures at which it would otherwise be necessary to maintain the solutions in the lower sections of the subsequent fractionating column used for the separation of ethylbenzene from styrene.

In the preferred embodiment of my invention, I have found it desirable not to make a sharp and complete separation of materials boiling higher than styrene in the flash distillation step (tar still) because such a sharp separation would require the use of a fractionating column of many plates and consequently would necessitate the exposure of the styrene-containing portion to excessively high temperatures for relatively long periods of time. The overhead from the flash distillation step is then fractionated into a distillate consisting of substantially pure ethylbenzene and a residue consisting of about 65%, and preferably more than 65%, of styrene, the remainder of which comprises ethylbenzene, hydrocarbons having boiling points close to that of styrene, and higher boiling hydrocarbons. This residue which contains about 65% or more of styrene is then subjected to a second flash distillation to remove tars and any high-boiling or solid inhibitors which may have been added in the preceding distillations. The overhead from the second flash distillation, containing approximately 65% or more of styrene, together with ethylbenzene, products having boiling points close to that of styrene, and products having boiling points higher than that of styrene, is then subjected to static crystallization, in one or more stages, to obtain styrene of the desired purity.

Figure 1:
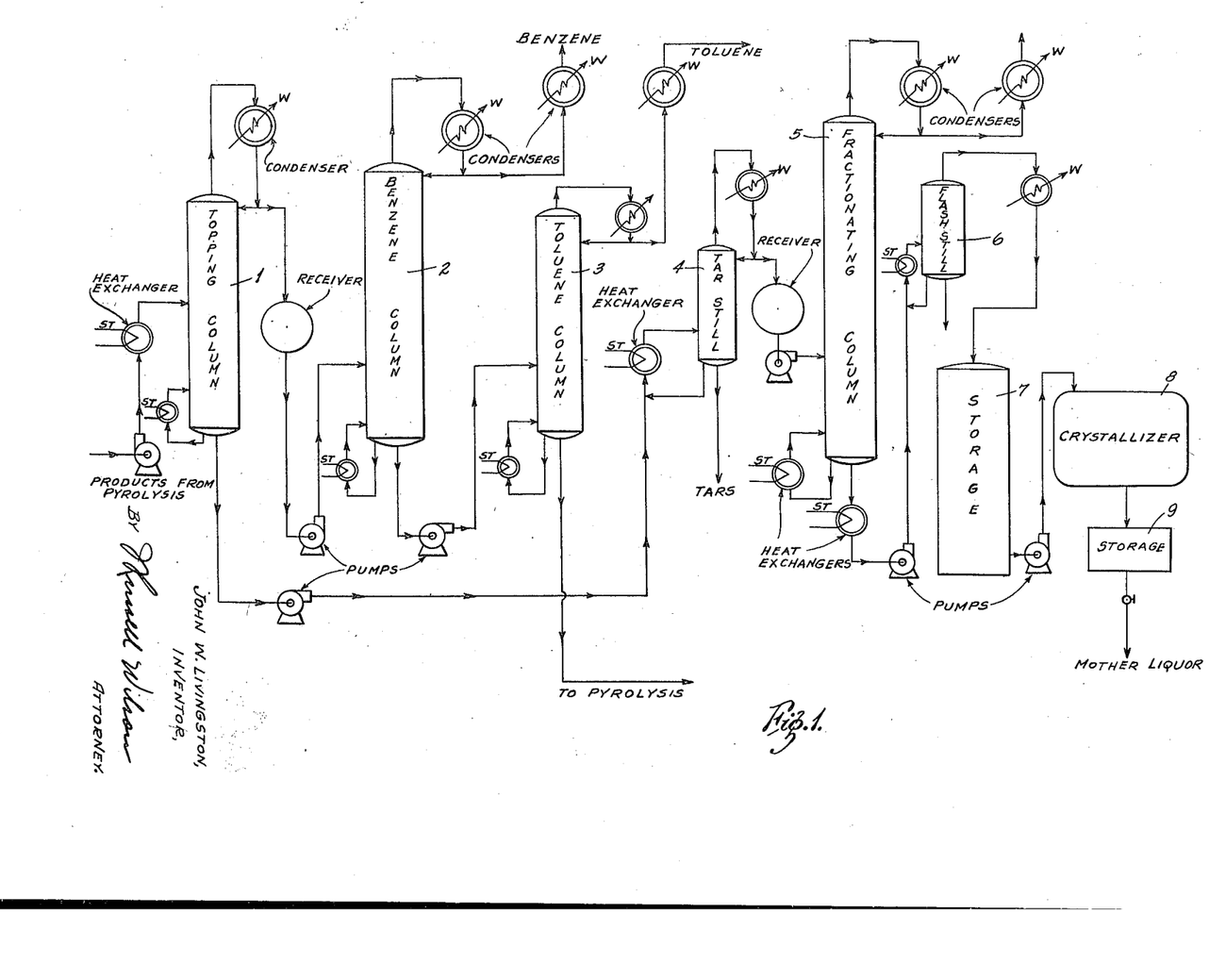

The process of the invention will be more readily apparent when considered in connection with Figue 1 of the accompanying drawings, which represents a flow sheet of the process. The products of the pyrolysis are passed to a topping column 1, where benzene and toluene are separated as a mixed distillate, leaving a residue which contains substantially all the original styrene. The benzene and toluene are separated from each other in a benzene column 2 and a toluene column 3. The residue from the topping column 1 is charged to a tar still 4, which is a flash still, in which a separation of the greater portion of the tar is effected. This separation is made at this point to reduce the temperature at which the bottoms would otherwise have to be maintained in the subsequent fractionation (in fractionating column 5). The distillate from the tar still 4, which consists of styrene, ethylbenzene and hydrocarbons having boiling points close to that of styrene, together with a small portion of higher boiling materials, is then passed to a fractionating column 5. In the ethylbenzene or fractionating column 5 a separation is made of ethylbenzene distillate substantially free from styrene and a residue consisting of an ethylbenzene fraction containing about 65% or more of styrene. The residue of this distillation is passed to a flash still 6 for removing any residual tar and any high boiling or solid inhibitors which may have been used in the columns to inhibit polymerization. The distillate is collected in a storage tank 7, from which it is fed to the static crystallizer 8 for effecting a separation of styrene from ethylbenzene and small amounts of hydrocarbons having boiling points close to that of styrene and hydrocarbons having boiling points higher than that of styrene, which are referred to as "high boilers."

In Figure 1, the flow sheet of the process, the various pumps, heat exchangers, receivers, and condensers or coolers which are used in the process are represented. These are generally of different capacities throughout the system, depending upon the capacities of the various columns, upon the amount of material being processed at the particular points and the prevailing temperatures. Additional condensers, receivers, heat exchangers and pumps may be provided, as is obvious, or some of those represented may be omitted, in accordance with individual requirements. Other columns, lines and valves which may be used to accomplish certain of the alternatives and variations referred to hereinafter may be added in conventional manner as desired.

The other figures of the accompanying three sheets of drawings relate more particularly to the static crystallization feature of the process.

By using the process of the invention a considerable advantage is obtained in the recovery of styrene from styrene-containing pyrolysis products. The styrene in the products is subjected to a minimum of fractional distillation operations at temperatures which induce polymerization. Thus, it is segregated by distillation into a fraction containing about 65%, and preferably about 90%, of styrene, and generally not more than about 96% styrene, which contains ethylbenzene, hydrocarbons having boiling points close to that of styrene, and high boilers. As a result, the loss of styrene engendered by polymerization during distillation is reduced substantially. To produce solely by distillation a separation of styrene of 99% purity, approximately one or more columns of size and capacity comparable to the fractionating column 5 used in this invention would be required and the sojourn of the styrene in the various columns would be for a period from about twice to three times as long as is contemplated in the present invention. It is a relatively simple operation to obtain a 96% styrene fraction by distillation as compared to concentrating by distillation a 96% fraction to a fraction of 99% or better purity, and polymerization in the latter operation is far more difficult to control. In the static crystallization procedure there is no danger of polymerization of the styrene and the equipment required for the crystallization procedure to produce styrene of high purity is much less costly than the additional columns which would be required to effect a comparable separation by distillation.

In the flow sheet of Figure 1, the residue of the toluene column 3 is indicated as being returned to the pyrolysis. This residue, which consists of substantially pure ethylbenzene, with a small proportion of styrene, may be passed on to the ethylbenzene column 5, if desired, or may be treated in other manners. The mother liquor from the static crystallizer 8, if it is still rich in styrene, may be charged to a second static crystallization unit. If the mother liquid from either the first or a successive static crystallization has become impoverished or substantially depleted in styrene, it may be subjected to a fractional distillation to separate high boilers from the styrene and ethylbenzene, after which the ethylbenzene and styrene distillate may be charged directly to the ethylbenzene column 5.

In the various distillation columns, inhibitors may be added, if desired, to suppress the polymerization of styrene. The amount will vary with the different columns, more being required in the columns containing high concentrations of styrene than in those containing low concentrations. Separation of the inhibitors from the residue of the distillation before it is subjected to static crystallization will generally be necessary as a consequence. This is accomplished by distillation in flash still 6. The process of the present invention is particularly useful in that it contemplates distillation with a minimum amount of inhibitors. Suitable inhibitors are para-tertiary-alkylphenols, sulfur, nitrobenzenes and the like.

In the distillation contemplated in the process of the present invention it will be noted that the styrene is at all points diluted with substantial proportions of other hydrocarbons. Except in tar still 4 and flash still 6, the styrene-containing fraction is not distilled over as distillate but appears as residue. In the first flash distillation in tar still 4, in which the styrene passes over in the overhead, no attempt is made to achieve a high degree of fractionation, and the styrene present in the vapors is diluted with vapors of other hydrocarbons having boiling points close to and higher than that of styrene. In flash still 6 much the same condition prevails.

The following results are typical of those obtained in the practice of the invention:

To a 40-plate topping column, having a reflux ratio of 5:1 was charged a product resulting from the pyrolysis of ethylbenzene, which had the composition in per cent by weight indicated in the table. This column corresponds to column 1 of Figure 1. The temperature gradient in the column was 296° F. at 19.2 lbs./sq. in. at the bottom to 241° F. at 15.2 lbs./sq. in at the top. The composition of the charge, distillate and residue of this distillation were approximately as indicated in the table:

|  | Percent by weight | | |
| --- | --- | --- | --- |
|  | Charge | Distillate | Residue |
| Benzene | 6 | 37 |  |
| Toluene | 5 | 26 | <1 |
| Ethylbenzene | 63 | 36 | 68 |
| Styrene | 21 | <1 | 25 |
| Isopropylbenzene | <1 |  | <1 |
| High boilers | <1 |  | <1 |
| Other materials (residue) | 3 |  | 4 |
| Proportion of charge | 100 | 17.3 | 82.7 |

The distillate from the topping column was subjected to distillation in benzene and toluene columns, corresponding to columns 2 and 3, respectively, of Figure 1, to separate benzene from toluene. These were conventional distillations.

The residue from the topping column was subjected to flash distillation in a tar still containing three entrainment plates, which corresponds to 4 of Figure 1. The temperature gradient in this still was 216° C. at a pressure of 1.6 lbs./sq. in. at the bottom to 145° C. at 1.2 lbs./sq. in. at the top and the reflux ratio was 1/5:1. The analyses of the charge to this column and of the distillate and residue obtained therefrom were substantially as follows:

|  | Per cent by weight | | |
| --- | --- | --- | --- |
|  | Charge | Distillate | Residue (tar) |
| Toluene | <1 | <1 |  |
| Ethylbenzene | 68 | 72 |  |
| Styrene | 25 | 26 | <1 |
| Isopropylbenzene | <1 | <1 |  |
| High Boilers | <1 |  | 7 |
| Other materials (residue) | 4 |  | 92 |
| Proportion of charge | 100 | 95.2 | 4.8 |

The distillate from the tar still was then charged to a 120-plate fractionating column, divided in two sections of 60 plates each, which corresponds to column 5 of Figure 1. The residue (bottom) of the first 60-plate section is charged to the top of the second 60-plate section and the distillate of the second 60-plate section is charged to the bottom of the first 60-plate section. In this column the reflux ratio was 5:1 and the temperature gradient was 197° F. at a pressure of 2.6 lbs./sq. in. at the bottom to 146° F. at a pressure of 1.2 lbs./sq. in. at the top. The composition of the charge, distillate and the residues (residue I being the material from the bottom of the first 60-plate section and residue II being the material from the bottom of the second column) were substantially as follows:

|  | Per cent by weight | | | |
| --- | --- | --- | --- | --- |
|  | Charge | Distillate | Residue I | Residue II |
| Ethylbenzene | 72 | >99 | 53 | <1 |
| Styrene | 26 | <1 | 45 | 92 |
| Isopropylbenzene | <1 |  | <1 | 4 |
| High boilers | 1 |  | <1 | 3 |

The residue from the fractionating column (residue II) was then ready to be charged to the flash still 6 and then to the static crystallizer. It may be stored temporarily in a storage tank 7 represented in Figure 1 of the drawings.

The fractionating columns 5 which are used in the practice of the present invention may be of varying capacities, efficiencies and have varying numbers of plates, dependent upon the styrene content and character of the initial charge stock, which will generally contain from about 20% to 50% styrene, and upon the degree of fractionation effected before the fractionating column is reached. The fractionating column should be designed to remove ethylbenzene as distillate substantially free from styrene. It should also be capable of providing a residue containing from 65% to 96% styrene. Generally, fractions containing from 65% to 75% or 85% styrene will be found to be satisfactory for the subsequent static crystallization operation. In fractional distillation the critical region, in which the styrene is substantially undiluted with other materials, polymerization is difficult to suppress and a great number of plates are required to achieve relatively little purification, is that region beyond about 96% styrene, and this is so regardless of the styrene concentration in the initial charge stock used in the process.

Figure 2:
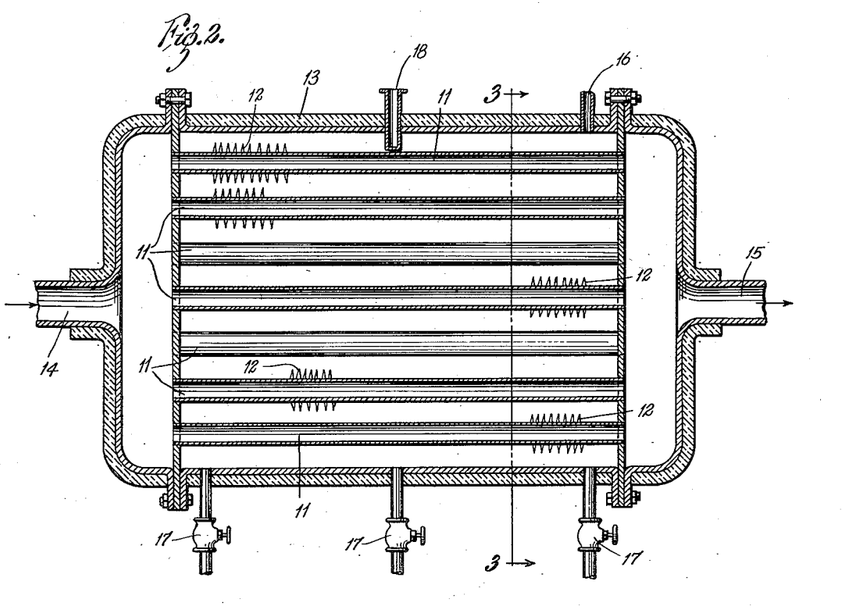
Figures 2 and 3 are cross-sectional views of a suitable apparatus for conducting the process of recovering styrene by static crystallization from the overhead of flash still 6.
Figure 3:
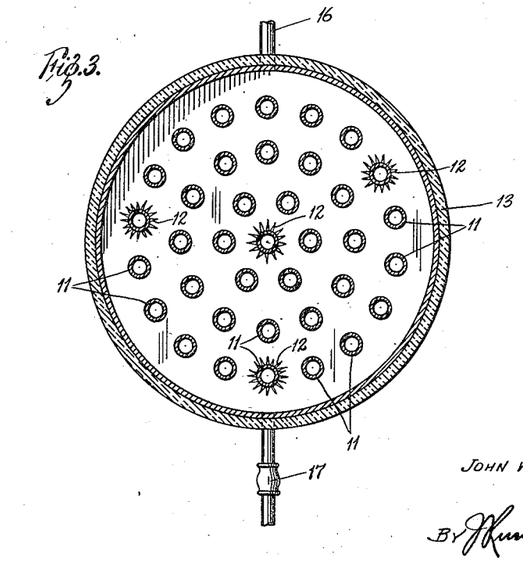

For the static crystallization, the residue from the ethylbenzene or fractionating column 5 is charged to a tar still 6 and the distillate is stored in storage tank 7 and then subsequently charged to a crystallizer 8, which may be of the form represented in Figures 2 and 3 of the accompanying drawings. Figures 2 and 3 represent cross-sectional views of one form of apparatus in which the static crystallization may be suitably conducted. This apparatus consists of a metal container or chamber provided with a series of horizontal stationary tubes 11, held in place by tube sheets, through which cooling liquid may flow and upon which solidifying or crystallizing styrene 12 may deposit. These tubes may be disposed in the chamber in various manners, for example, in a concentric equidistant circular arrangement as shown in Figure 3. The choice of metal from which the chamber and tubes are constructed is not critical but it should preferably be non-rusting and resistant to styrene. For this purpose, steel, stainless steel, aluminum and nickel and various alloys may be used. The metal container may be covered with a coating 13 of cork or other suitable heat-insulating material. Alternatively, for this purpose, a separate insulating chamber containing silica aerogel ("Santocel") or other material may be provided or other suitable provision for heat-insulation may be made. The container is provided with one or more inlets 14 and one or more outlets 15 for cooling fluid and with one or more inlets 16 for material from which styrene is to be crystallized and one or more outlets 17 for withdrawing materials from the crystallizing or solidifying chamber. A thermometer well 18 or other suitable arrangement is provided for observing the temperature of the contents of the chamber. These crystallizing units may be of various sizes. A suitable size is one which is about 20 feet long and 5½ feet in diameter, containing 360 tubes having an outside diameter of 1⅜ inches and having a shell or batch capacity of about 3,000 gallons.

In conducting the static crystallization, in the apparatus illustrated in Figures 2 and 3, the styrene-containing mixture is introduced into the crystallizing compartment of the apparatus through the inlet 16. Cooling fluid is then circulated through the tubes 11. The cooling fluid may be alcohol, acetone, methyl chloride or other suitable fluid of low freezing point, either liquid or gaseous. Any suitable means may be used for cooling the fluid which is used to abstract heat from the tubes 11 and thereby by heat-exchange relationship cool the tubes themselves and the styrene-containing mixture in the chamber or container. The temperature of the mixture in the container is observed frequently. The abstraction of heat from the styrene-containing mixture may be made at a rapid rate at the start until the temperature approaches the crystallizing point. The inception or start of crystallization can usually be detected thermometrically because the mixture usually super-cools ½° to 1° C., then, when crystallization begins, the temperature rises to the true crystallizing point. When crystallization has started the rate of cooling is adjusted and controlled so that crystallization takes place gradually and progressively. The mass of needle-like styrene crystals is coherent and adheres to the surfaces of the tubes 11. After the deposition of crystals has been conducted to a desirable extent, the remaining mother liquor (liquid phase) is separated from the solid crystalline phase by opening the stopcocks on the outlet tubes 17.

The mother liquor is allowed to drain from the deposit of crystals on the tubes 11 for a short period while the temperature is maintained substantially constant. Thereafter the crystalline or solidified styrene is allowed to warm up slightly to melt some of the solid styrene and thereby to effect sweating. This is accomplished by circulating warmer fluid through the tubes 11. As the solid melts, it will dissolve in the mother liquor adhering to the crystals and the resultant solution will gradually drain from the crystals. The draining solution can be segregated and collected in various fractions, which are progressively richer in styrene as the sweating proceeds. Sweating is continued until crystals of the desired purity result. The composition of the crystals can be calculated, approximately, from the weights and compositions of the original starting material, the mother liquor, and the sweats removed. Then the crystalline deposit remaining in the crystallizer may be warmed rapidly to melt the remainder of the adhering crystals. This melt is removed and collected, and the apparatus is prepared for subsequent treatment of another batch.

The drainings or sweatings which are not of the desired purity may be returned to a second or successive static crystallization operations for further treatment to produce further purification. The mother liquor, as hereinabove stated, can be returned to the ethylbenzene column 5 or to tar still 4, after separation of high boilers therefrom.

Figure 4:
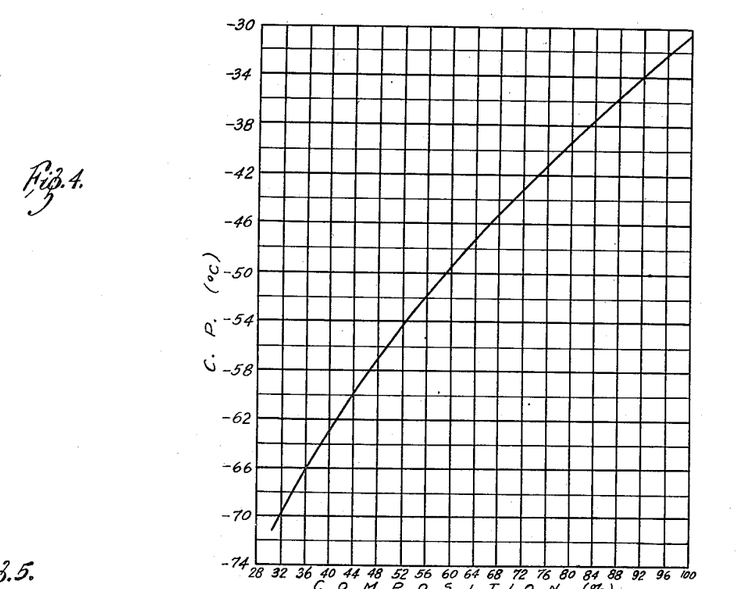
Figure 4 is a curve of the crystallization points of mixtures of styrene and ethylbenzene containing more than 30% styrene. The ordinates of this curve represent crystallizing points in ° C. of the mixture and the abscissae represent composition of the mixture in % styrene by weight.

The crystallizing point of pure styrene is approximately −30.66° C. and that of pure ethylbenzene is reported as −95° C. If a eutectic mixture of styrene and ethylbenzene is formed, it would probably have a eutectic point lower than −95° C. As far as is known, the eutectic point of the system, styrene-ethylbenzene, has never been determined, but I have found that mixtures containing about 31% styrene and 69% ethylbenzene will deposit styrene when cooled to about −70° C. without any ethylbenzene separating and that mixtures richer in styrene will deposit styrene crystals at temperatures between −70° C. and −30.66° C. (crystallizing point of pure styrene). In Figure 4 is illustrated a curve showing the crystallizing points for ethylbenzene-styrene mixtures of various compositions. From the shape of this curve it appears that the concentration of the eutectic mixture is about 15% styrene and 85% ethylbenzene. When a mixture containing less than about 15% styrene is cooled the crystals which separate will be ethylbenzene and not styrene crystals. The importance of this point should be understood since when the mother liquor approaches such concentration, that is, becomes so impoverished or depleted in styrene, a separation of ethylbenzene crystals or crystals having a composition corresponding to that of the eutectic mixture will occur; however, the temperature at this point must, of course, be low enough for crystallization.

The rate at which the cooling is conducted and the period during which crystallization is effected in the static crystallization are controlling factors, although wide variation is possible in both these factors, dependent upon the concentration of styrene in the starting material and the product desired. The crystals formed should be large. In general, they should be allowed to grow slowly and should be disturbed as little as possible during growth. For general purposes, the rate of cooling, after crystallization starts, should not be faster than about 2° C. per hour, although this, of course, will be dependent, as can be seen from Figure 5, on other factors. By controlling the temperature itself during the crystallization the deposition of substances other than styrene can be prevented.

In the sweating operation, the rate and the period over which sweating is effected also have an effect on the purity of the resulting product. It is possible to heat so rapidly that complete melting without any substantial sweating of the crystalline deposit will occur. When the sweating is carried out with gradually increasing temperatures and over a period of hours, less crystalline material need be sweated and the diffusion is greater and washing is more effective and, as a result, the remaining crystalline deposit is much purer than would result on rapid heating over a short period. Here again the rate and period of heating are variable but generally the temperature of the crystalline deposit should not be raised more than about 5° C. per hour.

The static crystallization referred to herein differs from conventional crystallization or from heretofore known processes of recovering styrene by freezing in that the crystallization is effected without stirring or agitation and without substantial disturbance of the mixture while it is undergoing crystallization and without transference of the crystals for separation from the mother liquor. The crystals are formed in a gradual and progressive manner as a coherent deposit of acicular crystals on the cooling surfaces and are not subjected at any time to washing with extraneous liquids. After removing the mother liquor, the crystalline coherent deposit adhering to the cooling surface is then subjected to gradual and progressive heating while the melted or sweated material drains and washes the remaining crystals. Styrene crystals retain on their surfaces variable amounts of mother liquor, which may amount to about 10% of the weight of the crystals. This mother liquor cannot be removed completely by suction or centrifugation and if the crystals are washed with other washing liquids there is a possibility of retention of and contamination by these washing liquids. By sweating the styrene crystals, the mother liquor is diluted and displaced by melted styrene.

The coherent deposit of styrene crystals is composed of individual styrene crystals in the form of needles that average approximately 1 inch in length and $\frac{1}{16}$ inch in diameter or larger. The crystals formed by conventional crystallization procedures, in which the crystallizing mass is agitated and the cooling is rapid, will generally be much smaller, being about ⅛ inch long and about 0.002 to 0.003 inch in diameter.

The characteristics of the crystals, particularly their dimensions, are important considerations since small crystals cannot be sweated and drained properly.

The process of my invention has a number of advantages over methods of purification which employ only fractional distillation. It is much easier to obtain styrene of 99% or better purity by my process than by distillation. There is little possibility of the styrene polymerizing during the crystallization, since the mass is maintained at low temperatures. There is also little possibility of the formation of oxidation products during crystallization. The styrene which can be obtained readily in my process is of a purity greater than 99%.

The exact crystallization or melting points of pure styrene are not known but my results indicate the crystallization point to be about —30.66° C. Purified products of my invention, which assay 99% or better styrene, generally have crystallizing points between approximately —30.7° C. and —31.0° C. Polymers heretofore made from styrene of about 99% purity that was obtained by fractional distillation invariably contain objectionable methanol-soluble constituents. The reason for this is not known, but styrene of comparable purity produced by my process forms polymers that are relatively free from these objectionable methanol-soluble constituents.

From Figure 4 it is possible to determine the point at which crystallization of a styrene-ethylbenzene mixture of known concentration will begin. For practical purposes, these points are approximately the same for the mixtures used in this process of this invention and for mixtures of styrene and compounds other than ethylbenzene which have molecular weights close to that of styrene. This curve may be used generally as a guide in estimating at approximately what temperature the start of crystallization may be expected with mixtures of known styrene concentration.

A mixture which contains from 65 to 90% styrene will not give in one crystallization an appreciable quantity of crystalline styrene which after sweating will be of 99% purity. For the purpose of obtaining a product of 99% purity, I prefer to take the product from the static crystallization of a 65 to 90% styrene mixture, which product may assay 90% styrene or higher, and thereafter subject it to a second static crystallization. Thus, to provide a product assaying 99% or higher of styrene, I prefer to start with a fraction containing 93.5% or more styrene. The process of the invention, therefore, contemplates at least two crystallizations to provide styrene of 99% or higher purity from a mixture containing from about 65 to 90% styrene. This will be apparent in the examples of the static crystallization which follow:

*Example I (curve A of Figure 5)*

Into a metal crystallizer having a capacity of 8 liters, constructed substantially as shown in Figures 2 and 3 of the drawings, was placed 6885 grams of a styrene-ethylbenzene fraction consisting of 65.1% styrene and 34.9% ethylbenzene. This amount corresponds to 4482 grams of styrene charged. The mixture was cooled rapidly to about —45° C. and thereafter the cooling was continued with gradually diminishing temperature at a slow progressive rate. Crystallization started at —46.9° C. and the temperature of the crystallizing batch reached —60.8° C. after 17 hours, at which time the mother liquor was drained. During draining the temperature dropped still lower to —61.0° C., but, at the end of about 3 hours of draining, it had reached about —60.4° C. Sweating was then started and the first fraction (sweat) was collected after the sweating had progressed about 5 hours, at the end of which time the temperature had reached about —46° C. Seven sweated fractions were removed during the course of the sweating, which was conducted for about 18 hours, and these separate fractions, which were called "1st sweat," "2d sweat," and so on, were analyzed. The temperature of the batch after the final sweating was −31.3° C. From the analyses of the sweated fractions, the composition of the crystals remaining in the crystallizer at the points at which the fractions were cut was calculated.

The weight of the styrene crystals remaining in the crystallizer which could be recovered as styrene of the indicated purity was then compared with the weight of styrene actually charged and this value was called the "yield" and is indicated as such in the table. That is, the yield of 65.6% obtained after draining of the mother liquor and before the first sweat was started means that 65.6% of the 4482 grams of styrene charged could be recovered as crystals or liquid containing 88.6% styrene.

| Fraction | Fraction | | Crystals | | Portion of curve A traversed |
|---|---|---|---|---|---|
| | Weight in grams | Styrene content, per cent | Styrene content, per cent | Yield, per cent | |
| Charge | 6885 | 65.1 | | | |
| Crystals | 716 | | 97.1 | 16.5 | |
| 7th sweat | 384.1 | 94.4 | 96.0 | 25.1 | S6-S7 |
| 6th sweat | 389.7 | 92.7 | 95.3 | 33.7 | S5-S6 |
| 5th sweat | 325.3 | 91.2 | 94.5 | 40.8 | S4-S5 |
| 4th sweat | 338.8 | 89.5 | 93.7 | 48.0 | S3-S4 |
| 3rd sweat | 340.1 | 86.1 | 92.8 | 54.8 | S2-S3 |
| 2nd sweat | 308.0 | 82.4 | 91.5 | 60.8 | S1-S2 |
| 1st sweat | 318.6 | 62.6 | 88.6 | 65.6 | S-S1 |
| Mother liquor | 3348 | 41.1 | | | D-S |

In the columns of the table the data have the following significance:

"Weight of Fraction" indicates the weight of that particular fraction recovered.

"Styrene content of Fraction" represents the percentage of styrene actually found by analysis in that fraction.

"Styrene content of Crystals" is the calculated percentage of styrene contained in the crystals in the crystallizer at the start of the particular sweating or, in the case of the "Crystals" fraction, in the crystals at end of the final sweating. "Yield" is the percentage of the total styrene charged that can be recovered at the particular point as styrene crystals of the indicated styrene content.

Figure 5:
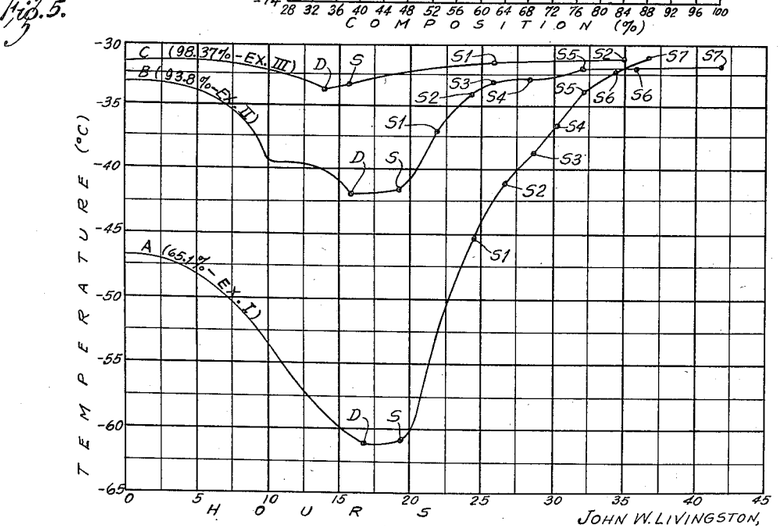
In Figure 5 are represented the time-temperature relationships prevailing in three typical static crystallization operations for the purification of mixtures of various initial styrene contents. These latter figures are referred to more specifically hereinafter.

In Figure 5 of the accompanying drawings, the course of the crystallization, draining and sweating for this run is indicated graphically on curve A. The curve starts at the time crystallization was noted and the points on this curve are D, which represents start of draining S, which represents the end of draining and the beginning of sweating S1, which represents the end of the first sweat, and S2, which represents the end of the second sweat, and so on.

The compositions and yields of the crystals at the indicated points can be obtained by reference to the table of data for this run given hereinbefore. The materials that are listed are "Charge" which represents the original mixture used "Crystals" which represents the crystals remaining in the crystallizer after the last sweating in the run (that is, at point S7 on curve A)

"2nd sweat" which represents the fraction removed as melt from the crystallizer after the end of the first sweat (that is, the liquid material removed between points S1 and S2 on curve A)

"1st sweat" which represents the liquid fraction removed from the crystallizer from the end of the draining and the beginning of sweating to the beginning of the second sweat (that is, the liquid material removed between points S and S1 on curve A), and so on.

"Mother liquor" which represents the liquid removed after crystallization has been stopped and sweating has begun (that is, the liquid material removed between the points D and S on curve A).

*Example II (curve B of Figure 5)*

Proceeding as described in Example I the crystallizing unit was charged with 7070 grams of a styrene fraction obtained by fractionation of the products of pyrolysis of ethylbenzene which had a styrene content of 93.8%. The fraction was cooled rapidly to about −32° C., and thereafter the cooling was continued with gradually diminishing temperature at a slow progressive rate. Crystallization started at about −33.2° C. and was continued for about 16 hours until the temperature had dropped to about −41.8° C. The crystals were then allowed to drain for about 3 hours, during which period the temperature rose to about −41.3° C. Sweating was then started. Seven fractions were collected during the sweating, which was conducted for 23 hours and until the final temperature of sweating reached −31.6° C.

The progress of the crystallization, draining and sweating is shown in curve B of Figure 5. The system used for designating the various points is the same as that described for curve A in connection with Example I.

The data on this run are as listed in the table which follows:

| Fraction | Fraction | | Crystals | | Portion of curve B traversed |
|---|---|---|---|---|---|
| | Weight in grams | Styrene content, per cent | Styrene content, per cent | Yield, per cent | |
| Charge | 7070 | 93.8 | | | |
| Crystals | 3855 | | 99.4 | 57.7 | |
| 7th sweat | 233.9 | 97.3 | 99.2 | 61.1 | S6-S7 |
| 6th sweat | 286.9 | 96.9 | 99.1 | 65.3 | S5-S6 |
| 5th sweat | 298.7 | 96.2 | 98.9 | 69.7 | S4-S5 |
| 4th sweat | 315.7 | 95.1 | 98.7 | 74.2 | S3-S4 |
| 3rd sweat | 334.1 | 93.3 | 98.2 | 78.8 | S2-S3 |
| 2nd sweat | 374.4 | 89.9 | 97.8 | 84.1 | S1-S2 |
| 1st sweat | 403.5 | 81.3 | 96.6 | 89.0 | S-S1 |
| Mother liquor | 936 | 73.5 | | | |

*Example III (curve C of Figure 5)*

Into a metal crystallizer of 8-liters capacity, constructed substantially as shown in Figures 2 and 3 of the drawings, such as used in Example I, was placed 6868 grams of a mixture of styrene and ethylbenzene, the composition of which was 98.4% by weight of styrene and 1.6% by weight of ethylbenzene. This amount corresponds to 6758 grams of styrene charged. The mixture was cooled rapidly until crystallization started, which was at a temperature of −31.34° C. The cooling was then allowed to progress slowly with gradually diminishing temperature for 13 hours, 20 minutes, after which time the temperature had reached −33.63° C. The mother liquor was then drained from the crystallizing chamber, over the course of 2 hours, 10 minutes, at which time the temperature had reached −33.33° C. Sweating was then started with gradually increasing temperature and continued progressively for a period of about 19 hours, after which time the temperature had reached −31.44° C. Fractions were removed at two periods during the entire sweating and these separate fractions, which were called "1st sweat" and "2nd sweat" were analyzed. From these analyses of the sweated fractions, the composition of the crystals remaining in the crystallizer at the points at which the fractions were cut was calculated.

The progress of the crystallization, draining and sweating is shown in curve C of Figure 5. The system used for designating the various points is the same as that described for curve A in connection with Example I.

The data on this run are as listed in the table which follows:

| Fraction | Fraction | | Crystals | | Portion of curve C traversed |
|---|---|---|---|---|---|
| | Weight in grams | Styrene content, per cent | Styrene content, per cent | Yield, per cent | |
| Charge | 6868 | 98.37 | | | |
| Crystals | 5004 | | 99.56 | 73.6 | |
| 2nd sweat | 304 | 98.2 | 99.46 | 98.2 | S1-S2 |
| 1st sweat | 989 | 96.4 | 99.15 | 92.4 | S-S1 |
| Mother liquor | 617 | 92.0 | | | D-S |

The yield of 92.4% of crystals obtained after draining and before the first sweat was started means that 92.4% of the 6758 grams of styrene charged could be recovered as crystals containing 99.15% styrene. The 73.6% yield of styrene crystals of 99.56% purity represents the amount remaining after removal of the two sweated fractions.

As used herein, the term "sweating" is to be understood to mean the removal from the crystal deposit of adherent mother liquid together with melted portions of the crystal deposit by gravity as a result of the partial melting of the crystals. The process of sweating is thus a washing or displacing process in which liquid supplied by melting the crystals acts as the washing or displacing fluid. The term "boiling point close to that of styrene" is to include that of ethylbenzene and other compounds which have boiling points about 10° C. or so higher or lower than styrene.

In general, it may be stated, and is apparent from the foregoing results, that when the styrene fraction charged to the first crystallizer contains from about 65% to 90% styrene, the first static crystallization followed by a moderate amount of sweating will yield a product of about 90% or higher styrene content in substantial amount. This product when subjected to a second crystallization and a moderate amount of sweating will yield a product of 99% or higher purity. Of course, using a 65% styrene-containing mixture as a charge stock, it is possible to obtain by one static crystallization and sweating treatment a product containing 99% styrene but the yield would be small and the proportion of crystallized material which is removed in the sweating procedure would be exceedingly large, and the sweating period itself would be exceedingly long. In the process of the present invention the stock charged to the first crystallizer will not contain substantially more than about 96% styrene, since to obtain fractions of higher styrene content by fractional distillation would result in a loss of styrene by polymerization and involve the use of expensive fractionating equipment.

Inasmuch as the foregoing description comprises preferred embodiments of the invention, it is to be understood that the invention is not restricted thereto and that changes and modifications may be made therein without departing substantially from the invention, which is defined in the appended claims.

I claim:

1. The process of recovering styrene from a styrene-containing hydrocarbon mixture resulting from the pyrolysis of hydrocarbons, which comprises subjecting said mixture to distillation to separate benzene, toluene and lower-boiling hydrocarbons as distillate from the styrene-containing hydrocarbon mixture, subjecting the residue of said distillation to a flash distillation to separate therefrom a substantial proportion of tars and hydrocarbons having boiling points substantially in excess of that of styrene, subjecting the distillate of said flash distillation to fractional distillation to separate ethylbenzene and to leave a residue containing at least approximately 65% and not substantially more than approximately 96% of styrene, subjecting said residue to flash distillation to remove tars, and thereafter depositing styrene from the distillate of said flash distillation by cooling the distillate in heat-transfer relationship with a heat-abstracting surface under sufficiently static conditions so as to form a coherent deposit of crystalline styrene thereon, separating the liquid fraction from the solid coherent deposit without substantially disturbing the solid deposit, sweating said solid deposit by gradually raising the temperature thereof, whereby the solid deposit is washed by a portion of the melted solid and adhering liquid is displaced from the remaining solid deposit by the melted solid, and subsequently melting the remaining solid deposit and separately collecting the same.

2. The process as defined in claim 1 and further characterized in that the melted and collected solid deposit is subjected to a second static crystallization and sweating treatment.

3. The process of recovering styrene from a styrene-containing hydrocarbon mixture resulting from the pyrolysis of hydrocarbons, which comprises subjecting said mixture to distillation to separate benzene, toluene and lower-boiling hydrocarbons as distillate from the styrene-containing hydrocarbon mixture, subjecting the residue of said distillation to a flash distillation to separate therefrom a substantial proportion of tars and hydrocarbons having boiling points substantially in excess of that of styrene, subjecting the distillate of said flash distillation to fractional distillation to separate ethylbenzene and to leave a residue containing at least approximately 65% and not substantially more than approximately 96% of styrene, subjecting said residue to flash distillation to remove tars, and thereafter depositing styrene from the distillate of said flash distillation by cooling the distillate in heat-transfer relationship with a heat-abstracting surface to a temperature below approximately −31° C. and not substantially lower than approximately −65° C. under sufficiently static conditions so as to form a coherent deposit of crystalline styrene on said surface, removing by gravity those portions of the mixture that are liquid at that temperature without substantially disturbing the solid deposit, slowly heating the remaining solid deposit to a temperature between approximately −65° C. and −31° C. and continuously removing those portions of the mixture that are liquid at that temperature without substantially disturbing the solid deposit and subsequently melting the solid deposit and separately collecting the same.

4. The process of recovering styrene from a styrene-containing hydrocarbon mixture resulting from the pyrolysis of hydrocarbons, which comprises subjecting said mixture to distillation to separate benzene, toluene and lower-boiling hydrocarbons as distillate from the styrene-containing hydrocarbon mixture, subjecting the residue of said distillation to a flash distillation to separate therefrom a substantial proportion of tars and hydrocarbons having boiling points substantially in excess of that of styrene, subjecting the distillate of said flash distillation to fractional distillation to separate ethylbenzene and to leave a residue containing at least approximately 65% and not substantially more than approximately 75% of styrene, subjecting said residue to flash distillation to remove tars, and thereafter depositing styrene from the distillate of said flash distillation by cooling the distillate in heat-transfer relationship with a heat-abstracting surface to a temperature below approximately −40° C. and not substantially lower than approximately −65° C. under sufficiently static conditions so as to form a coherent deposit of crystalline styrene on said surface, removing by gravity those portions of the mixture that are liquid at that temperature without substantially disturbing the solid deposit, slowly heating the remaining solid deposit to a temperature between approximately −65° C. and −40° C. and continuously removing those portions of the mixture that are liquid at that temperature without substantially disturbing the solid deposit and subsequently melting the solid deposit and separately collecting the same, and thereafter subjecting said melted and collected solid deposit to a second static crystallization in which styrene is deposited from said mixture by cooling the mixture in heat-transfer relationship with a heat-abstracting surface to a temperature below approximately −31° C. and not substantially lower than approximately −65° C. under sufficiently static condition so as to form a coherent deposit of crystalline styrene on said surface, removing by gravity those portions of the mixture that are liquid at that temperature without substantially disturbing the solid deposit, slowly heating the remaining solid deposit to a temperature between approximately −40° C. and −31° C., and continuously removing by gravity those portions of the mixture that are liquid at that temperature without substantially disturbing the solid deposit, and subsequently melting the solid deposit and separately collecting the same.

5. The process of recovering styrene from a styrene-containing hydrocarbon mixture resulting from the pyrolysis of hydrocarbons, which comprises subjecting said mixture to distillation to separate benzene, toluene and lower-boiling hydrocarbons as distillate from the styrene-containing hydrocarbon mixture, subjecting the residue of said distillation to a flash distillation to separate therefrom a substantial proportion of tars, subjecting the distillate of said flash distillation to fractional distillation to separate ethylbenzene and to leave a residue containing at least approximately 65% and not substantially more than approximately 75% of styrene, subjecting said residue to flash distillation to obtain as overhead a fraction consisting of approximately 65% and not substantially more than 75% of styrene substantially free from tars, and thereafter depositing styrene from the flash distilled fraction by cooling the fraction in heat-transfer relationship with a heat-abstracting surface to a temperature below approximately −40° C. and not substantially lower than approximately −65° C. under sufficiently static conditions so as to form a coherent deposit of crystalline styrene on said surface, removing by gravity those portions of the mixture that are liquid at that temperature without substantially disturbing the solid deposit, slowly heating the remaining solid deposit to a temperature between approximately −65° C. and −40° C. and continuously removing those portions of the mixture that are liquid at that temperature without substantially disturbing the solid deposit and subsequently melting the solid deposit and separately collecting the same, and thereafter subjecting said melted and collected solid deposit to a second static crystallization in which styrene is deposited from said mixture by cooling the mixture in heat-transfer relationship with a heat-abstracting surface to a temperature below approximately −31° C. and not substantially lower than approximately −65° C. under sufficiently static condition so as to form a coherent deposit of crystalline styrene on said surface, removing by gravity those portions of the mixture that are liquid at that temperature without substantially disturbing the solid deposit, slowly heating the remaining solid deposit to a temperature between approximately −40° C. and −31° C., and continuously removing by gravity those portions of the mixture that are liquid at that temperature without substantially disturbing the solid deposit, and subsequently melting the solid deposit and separately collecting the same.

6. The process of recovering styrene from a styrene-containing hydrocarbon mixture resulting from the pyrolysis of hydrocarbons, which comprises subjecting said mixture to distillation to separate benzene, toluene and lower-boiling hydrocarbons as distillate from the styrene-containing hydrocarbon mixture, subjecting the residue of said distillation to a flash distillation to separate therefrom a substantial proportion of liquid tars and heavy residues, subjecting the distillate of said flash distillation to fractional distillation to separate ethylbenzene and to leave a residue containing at least approximately 65% and not substantially more than approximately 75% of styrene, subjecting said residue to flash distillation to obtain as overhead a fraction consisting of approximately 65% and not substantially more than 75% of styrene substantially free from tars and heavy residues, and thereafter depositing styrene from the flash distilled fraction by cooling the mixture in heat-transfer relationship with a heat-abstracting surface to a temperature below approximately −40° C. and not substantially lower than approximately −65° C. under sufficiently static conditions so as to form a coherent deposit of crystalline styrene on said surface, removing by gravity those portions of the mixture that are liquid at that temperature without substantially disturbing the solid deposit, slowly heating the remaining solid deposit to a temperature between approximately −65° C. and −40° C. and continuously removing those portions of the mixture that are liquid at that temperature without substantially disturbing the solid deposit and subsequently melting the solid deposit and separately collecting the same, and thereafter subjecting said melted and collected solid deposit to a second static crystallization in which styrene is deposited from said mixture by cooling the mixture in heat-transfer relationship with a heat-abstracting surface to a temperature below approximately −31° C. and not substantially lower than approximately −65° C. at a rate not substantially in excess of 2° C. per hour, after crystallization has started, and under sufficiently static condition so as to form a coherent deposit of crystalline styrene on said surface, removing by gravity those portions of the mixture that are liquid at that temperature without substantially disturbing the solid deposit, slowly heating the remaining solid deposit to a temperature between approximately −40° C. and −31° C., and continuously removing by gravity those portions of the mixture that are liquid at that temperature without substantially disturbing the solid deposit, and subsequently melting the solid deposit and separately collecting the same.

JOHN W. LIVINGSTON.